United States Patent [19]

Tamiya

[11] Patent Number: 4,602,527
[45] Date of Patent: Jul. 29, 1986

[54] DIFFERENTIAL GEARING

[75] Inventor: Shigeru Tamiya, c/o Yoneyama, 1-2, Tomioka 1-chome, Koto-ku, Tokyo, Japan

[73] Assignee: Shigeru Tamiya, Tokyo, Japan

[21] Appl. No.: 622,532

[22] Filed: Jun. 20, 1984

[30] Foreign Application Priority Data

Jun. 20, 1983 [JP] Japan .................................. 58-109400

[51] Int. Cl.$^4$ ........................... F16H 1/40; F16H 1/06; F16H 55/17; F16H 55/08
[52] U.S. Cl. ....................................... 74/713; 74/415; 74/436; 74/437; 74/457; 74/710
[58] Field of Search .............. 74/713, 710, 715, 412 R, 74/415, 416, 417, 423, 424, 434, 437, 457, 459.5, 436

[56] References Cited

U.S. PATENT DOCUMENTS

| | | | |
|---|---|---|---|
| 632,599 | 9/1899 | Travis | 74/416 |
| 1,514,522 | 11/1924 | Hilmes | 74/713 X |
| 1,776,677 | 9/1930 | Brewer | 74/713 |
| 1,980,237 | 11/1934 | Trbojevich | 74/713 X |
| 2,183,667 | 12/1939 | Buckendale | 74/713 |
| 3,597,990 | 8/1971 | McCartin | 74/415 |
| 3,782,210 | 1/1974 | Holleman | 74/415 X |
| 4,062,250 | 12/1977 | Lahl | 74/415 |
| 4,270,622 | 6/1981 | Travis | 74/713 X |

FOREIGN PATENT DOCUMENTS 1251794 12/1960 France .................................. 74/415

OTHER PUBLICATIONS

Fundamentals of Gear Design, Raymond J. Drago, 1982; FIG. 2.2.

*Primary Examiner*—Kenneth J. Dorner
*Assistant Examiner*—Stephen B. Andrews
*Attorney, Agent, or Firm*—Robert E. Burns; Emmanuel J. Lobato; Bruce L. Adams

[57] ABSTRACT

A differential for motor vehicles and the like effectively providing smooth power transmission from an input drive shaft driving two gears fixed axially spaced thereon driving with pin-like teeth, on side faces thereof, a driven gear having peripheral teeth oval in cross section and coaxial with two output bevel sun gears disposed opposed and having respective power output shafts for differential driving of the motor vehicle left and right wheels during turns. The output sun gears are disposed concentric with the driven gear with a common axis of rotation normal to the axis of rotation of the drive gears. The sun gears are driven differentially during vehicle turns by two bevel planetary gears each having as axis of rotation fixed in the driven gear and extending radially toward the axis of rotation common with the sun gears and symmetrical to the axis of rotation thereof.

6 Claims, 12 Drawing Figures

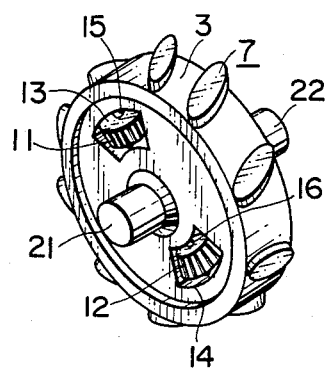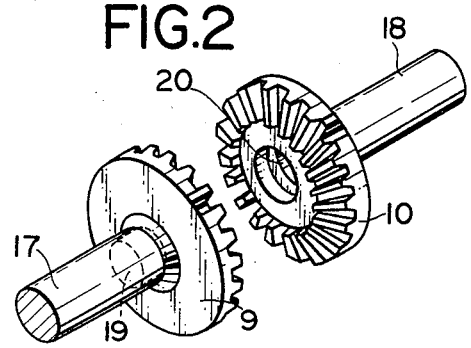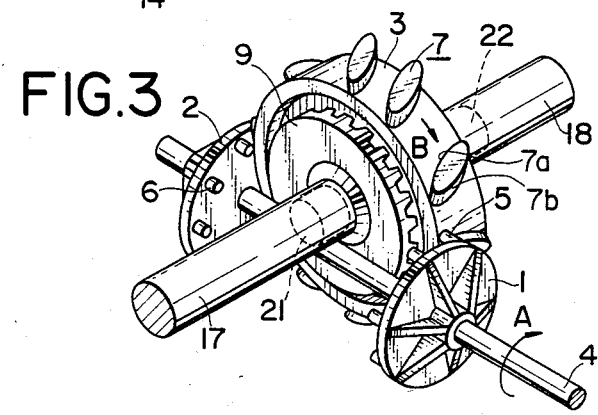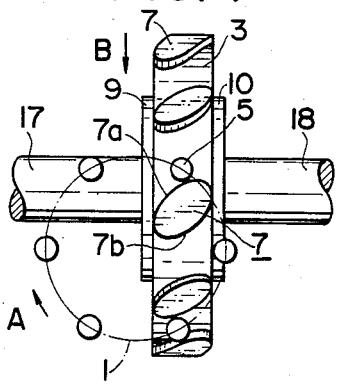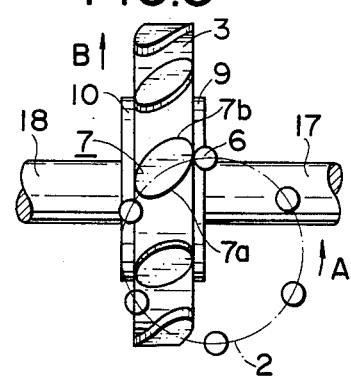

DIFFERENTIAL GEARING

BACKGROUND OF THE INVENTION

The present invention relates generally to differentials and more particularly to differential gearing for motor vehicle differentials driving differentially automobile wheels when turns are made to the left or right.

Conventional motor vehicle differentials have differential gearing in which bevel drive gears are driven by an input drive shaft and the driven gears are also bevel gears. The differential gearing itself is constituted by a carrier extending integrally from the driven gear with a planetary gear supported on the carrier. A pair of sun gears are connected to the right and left wheel output drive shafts and mesh with the planetary gear. The known differential constructions have shortcomings as to smoothness of operation, efficiency of power transmission, simplicity, size, operational life and production costs therefor.

SUMMARY OF THE INVENTION

An object of the present invention is the provision of differential gearing eliminating the above-mentioned shortcomings of known motor vehicle differentials.

Another object is to provide a motor vehicle differential construction for effectively carrying out power transmission smoothly in a simple, compact, durable differential manufactured at reduced production costs.

The differential, according to the invention, comprises a power input drive shaft driven for applying power to a pair of drive gears connected thereto axially spaced thereon so that the gear pair are driven in common in a same direction and at a same speed of rotation about a common axis of rotation provided by the power input shaft. The pair of drive gears are each provided on a corresponding major face thereof with teeth formed as pins of circular cross section parallel to the axis of rotation and arranged in a circle equally spaced for engaging peripheral teeth of a driven gear driven by the pair of input drive gears.

The driven gear is constructed with its peripheral teeth equally spaced thereon and having an oval cross section. The driven gear has an axis of rotation disposed in a plane normal to a plane passing through the axis of rotation of the pair of drive gears. The pins, which can each be constructed with a roller thereon, on the drive gears, contact the peripheral oval teeth of the driven gear tangentially imparting power transmission drive thereto. The individual pins, defining the teeth of the two drive gears, make contact alternately within a sequence of successive contacts so that the drive or power inputs are applied alternately by the drive gears.

The differential gearing has a pair of coaxial bevel sun gears opposed to each other and each having a power output shaft connected thereto for connection to respective left and right wheels, not shown, of a motor vehicle. The sun gears have an axis of rotation concentric with that of the driven gear which is disposed between the sun gears. To provide for differential driving of the output shafts two bevel planetary gears are carried by the driven gear internally thereof each with a separate axis of rotation extending inwardly toward and radially of the axis of rotation of the driven gear and of the sun gears. The two planetary gears are intermediate the two sun gears and mesh therewith. The individual axis of rotation of the planetary gears are spaced apart symmetrically of the axis of the driven gear and that of the sun gears.

BRIEF DESCRIPTION OF THE DRAWING

The above features and objects are set forth in detail in the following specification and claims and illustrated in the appended drawing in which:

FIG. 1 is a perspective view of part of a motor vehicle differential assembly embodying the present invention;

FIG. 2 is a perspective exploded view of sun gears of the differential assembly in FIG. 1;

FIG. 3 is a perspective view of assembled differential gearing according to the invention;

FIG. 4 is a fragmentary frontside elevation view of the differential gearing according to the invention;

FIG. 5 is a fragmentary backside elevation view of the differential gearing according to the invention;

DESCRIPTION OF PREFERRED EMBODIMENTS

Figure 6:
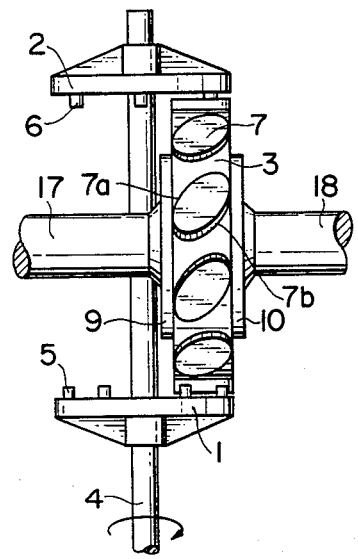
FIG. 6 is a plan view of the differential assembly illustrated in FIG. 3.
Figure 7:
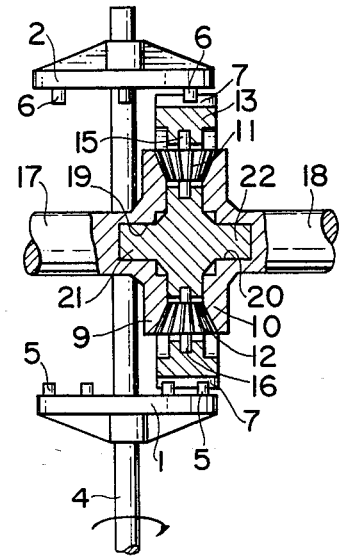
FIG. 7 is a cut-away plan view of the differential assembly of FIG. 6.
Figure 8:
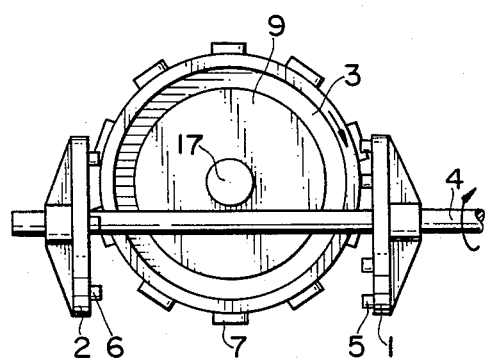
FIG. 8 is an end elevation view of the differential assembly in FIG. 6 viewed from the left.

The differential construction according to the present invention is intended to obtain improved results of the type accomplished by known differentials. There is a speed reduction function and differential drive outputs by differential gearing in the present invention. The differential construction has a pair of drive gears 1,2 and a driven gear 3. The two drive gears 1, 2 are fixed to a power input drive shaft 4 and axially spaced thereon for being driven thereby about a common axis of rotation in a same direction and speed.

The drive gears 1,2 have major faces opposed to each other on which are disposed pin-like teeth, 5,6, equally angularly spaced in a ring on a corresponding face of a drive gear. The pin-like teeth of drive gear 1 extend toward the teeth of the other related drive gear 2 and each are parallel to the axis of rotation of the drive gears defined by the power input drive shaft 4. The pin-like teeth have a circular cross section as shown.

The driven gear 3 has its axis of rotation normal to the input shaft 4, which provides the axis of rotation for the drive gears, and is provided with peripheral outwardly projecting teeth 7 on the outer periphery of the gear equally circumferentially spaced thereon. The peripheral teeth 7 extend radially from the outer periphery of the gear 3 to engage with the pin-like teeth 5,6 of the drive gears 1,2. Each of the peripheral teeth has an oval cross section with opposite side faces 7a, 7b profiled arcuately as cammed surfaces slanted relative to the path of the input drive teeth 5,6. The peripheral teeth have an oval shape so that the power transmission or input contact between the drive pin-like teeth and the oval peripheral teeth of the driven gear is tangential for smooth transmission of power thereto.

When the power input drive shaft 4 rotates in a clockwise direction illustrated by an arrow A in FIG. 3, a drive tooth 5 of the drive gear 1 engages the cammed surface 7a of a peripheral gear tooth 7 of the driven gear 3 in order to rotate the driven gear 3 in a direction illustrated by an arrow B. Before engagement between a tooth 7 and the next sequential pin-like tooth 5 and before disengagement of the pin-like tooth 5 from a peripheral tooth, a tooth 6 of the other drive gear 2 will engage and cam the face 7a of another gear tooth 7 in order to maintain a continuous power input applied to the driven gear in the direction of the arrow B. This mode of operation is illustrated in FIGS. 4 and 5. In this way, the pin-like teeth of the pair of drive gears 1,2 alternately push downwardly on the peripheral teeth of the driven gear 3 and push upwardly on the peripheral teeth of the opposite side of the driven gear 3 in order to rotate the driven gear effectively and smoothly in the same direction of rotation. In view of the construction and arrangement of the teeth, the gear teeth 5, 6 and 7 and gears 1,2 and 3 are easily constructed and the teeth and gears are of a strong construction.

Figure 10:
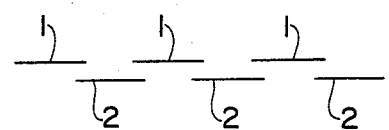
FIG. 10 is an explanatory diagram for explaining power transmission between the drive gears and the driven gear.

When the power input drive shaft 4 is rotated in an opposite or counterclockwise direction, a pin-like tooth 5 of the drive gear 1 pushes upwardly on the gear face 7b of a peripheral tooth 7 of the driven gear 3 so as to rotate the driven gear in a direction opposite to the direction of rotation illustrated by the arrow B. A pin-like tooth 6 of the other drive gear 2 pushes in a downward direction, the gear face 7b of another peripheral tooth 7 of the driven gear 3 in order to continue the smooth and continuous rotation of the driven gear in the opposite or counterclockwise direction. The alternate engagement of the driven gear by the drive gears is illustrated in FIG. 10. The lines representative of the two drive gears show an overlap representative of continuous input contact with the driven gear.

Figure 9:
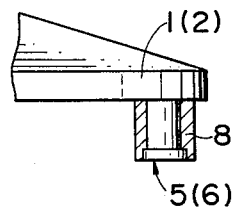
FIG. 9 is a fragmentary, on an enlarged scale, view, partly in section, of a pin-like drive tooth, according to the invention.

The pin-like teeth 5,6 are of a circular cross section so that there is a smooth transfer of power from the drive gears to the driven gear through the oval profiles of its peripheral teeth. However, the pin-like teeth can also be constructed with a roller 8 thereon as illustrated in FIG. 9.

The individual rollers 8 rotate on the cammed oval face of teeth 7 of the driven gear and do not slide thereon so that a more effective transmission of power is obtained with this kind of gear roller teeth construction.

The differential means of the differential gearing construction according to the invention is provided with a pair of bevel sun gears 9, 10 and bevel planetary gears 11, 12 meshing with the sun gears 9, 10. The sun gears have a common axis of rotation concentric with the axis of rotation of the driven gear 3 which is sandwiched between the sun gears. As described herein, it will be seen that the planetary gears each have an axis of rotation at right angles to the axis of rotation of the bevel sun gears.

The planetary gears 11, 12 fit into fan-shaped spaces 13,14 formed in the driven gear 3 so as to be rotatably mounted on the gear 3 by radial shafts 15,16 providing individual axis of rotation for the corresponding planetary gears which are transported in a circumferential direction relative to the sun gears by the driven gear 3. The individual axes of the planetary gears 11,12 are disposed symmetrically relative to the axis of rotation of the driven gear 3 and the teeth of the planetary gears 11,12 protrude from both the openings 13,14 and mesh with the coaxial opposed sun gears. The planetary gears 11,12 rotate on the driven gear and revolve around the sun gears simultaneously.

The sun gears are provided with respective power output shafts which constitute the right and left wheel power output drive shafts 17,18 for driving the respective vehicle wheels, not shown, fixed thereto to be driven by the sun gears 9, 10. Two respective bores 19,20 formed at the inner ends of the output drive shafts, 17,18 receive therein the shafts 21,22 of the driven gear.

When the motor vehicle runs along a straight path, the planetary gears 11,12 do not rotate and transfer the power input revolution of the driven gear 3 to the sun gears 9, 10 in order to rotate equally the right and left wheel drive shafts 17 and 18. When the vehicle turns either to the right or to the left, the planetary gears 11, 12 rotate and revolve about the sun gears simultaneously to rotate the outer wheel sun gear 9 or 10 more than the inner wheel sun gear 10 or 9 making the revolutions of the right and left drive shaft 17, 18 different from each other so that there is a differential mode of operation during turning of the motor vehicle.

Figure 11:
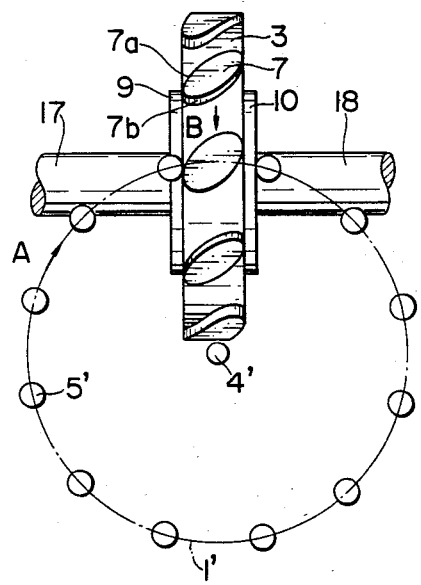
FIG. 11 is a frontside view of another embodiment of a differential gearing assembly according to the invention.
Figure 12:
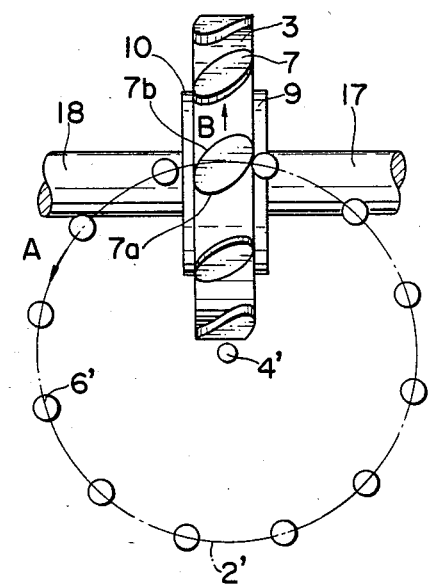
FIG. 12 is a backside view of the differential gearing assembly in FIG. 11.

As shown in FIGS. 11, 12, when the axis of 4' of drive gears 1', 2' as situated at the center of the outerface of the driven gear 3, the teeth 5',6' of the drive gears 1',2' engage with the teeth 7 of the driven gear 3 at the same angle in order to push downwardly or push upwardly the coresponding tooth 7 and thus the revolution of the driven gear by means of the drive gear is carried out more smoothly. These figs show another embodiment operating as described.

What is claimed is:

1. A differential for motor vehicles and the like comprising, an input drive shaft, a pair of coaxially spaced drive gears simultaneously driven by the input drive shaft in a same direction at a same speed of rotation about a common axis of rotation, a driven gear driven by the pair of drive gears for transmission of power from the input drive shaft, two coaxial opposed sun gears having an axis of rotation concentric with an axis of rotation of the driven gear, two planetary gears disposed between the sun gears for differential driving thereof during turns of the vehicle to the right and to the left with the sun gears for driving the sun gears, each planetary gear having a separate axis of rotation carried by the driven gear and each disposed therein and radially symetrically relative to the axis of rotation of the sun gears, and each sun gear having a respective power output shaft connected thereto for rotation therewith.

2. A differential for motor vehicles and the like comprising, an input drive shaft, a pair of coaxially spaced drive gears simultaneously driven by the input shaft in a same direction at a same speed of rotation about a common axis of rotation, a driven gear driven peripherally by the pair of drive gears for transmission of power from the input drive shaft, two coaxial opposed bevel sun gears having an axis of rotation concentric with an axis of rotation of the driven gear, two planetary gears disposed between the sun gears for differential driving thereof during turns of the vehicle to the right and to the left each meshing with the sun gears for driving the sun gears, each planetary gear having a separate axis of rotation carried by the driven gear disposed therein radially and symmetrically relative to the axis of rotation of the sun gears, and each sun gear having a respective power output shaft connected thereto for rotation therewith.

3. A differential for motor vehicles and the like according to claim 2, in which said driven gear has peripheral teeth, and in which said drive gears each have a respective face on which are disposed angularly spaced pin-like teeth circular in cross section disposed equally spaced in a circle and parallel to the axis of rotation of the drive gears for engaging the peripheral teeth of the driven gear, said driven gear being disposed with its axis of rotation in a plane normal to a plane passing through the common axis of rotation of the drive gears.

4. A differential for motor vehicles and the like according to claim 3, in which said driven gear is a ring gear, said peripheral teeth extending radially from the periphery of the ring gear equally spaced thereon, and each of the peripheral teeth having an oval cross section for tangential engagement by the pin-like teeth of the drive gears.

5. A differential according to claim 4, in which the drive gears and the individual pin-like teeth of the drive gears are disposed so that the individual pin-like teeth of one drive gear alternate with the individual pin-like teeth of the other drive gear in tangentially engaging the peripheral oval teeth of the driven gear, and engagement by the pin-like teeth is effected sequentially prior to disengagement of each pin-like tooth, whereby drive inputs to the driven gear are applied sequentially in a sequence in which the drive gears alternate in applying said drive inputs.

6. A differential according to claim 3, including for each pin a roller thereon for engaging the peripheral teeth of the drive gear.

* * * * *